United States Patent

[11] 3,612,993

| | | |
|---|---|---|
| [72] | Inventors | Harold A. Tims<br>Bartlesville, Okla.;<br>Joe P. Lindsey, Stafford, Tex. |
| [21] | Appl. No. | 45,505 |
| [22] | Filed | June 11, 1970 |
| [45] | Patented | Oct. 12, 1971 |
| [73] | Assignee | Phillips Petroleum Company |

[54] IMPEDANCE MEASURING APPARATUS
5 Claims, 1 Drawing Fig.

[52] U.S. Cl. .................................................. 324/57 R,
324/57 Z, 324/62 R
[51] Int. Cl. ...................................................... G01r 27/02
[50] Field of Search........................................... 324/57, 57
B, 57 Z, 62 B, 62 C, 57 NB

[56] References Cited
UNITED STATES PATENTS

| 2,939,079 | 5/1960 | Willmore.................. | 324/57 X |
| 3,139,579 | 6/1964 | Gravel...................... | 324/57 |
| 3,379,973 | 4/1968 | Walton...................... | 324/62 |

Primary Examiner—Herman Karl Saalbach
Assistant Examiner—Marvin Nussbaum
Attorney—Young and Quigg ABSTRACT: An unknown impedance is measured by means of an operational amplifier in which the unknown impedance and a reference impedance are connected in the feedback path selectively. A first calibrated resistance element is connected in the amplifier input circuit. A function generator having two outputs is connected to the amplifier and a second calibrated resistance element. The potential across the second resistance element is compared with the amplifier output.

PATENTED OCT 12 1971          3,612,993
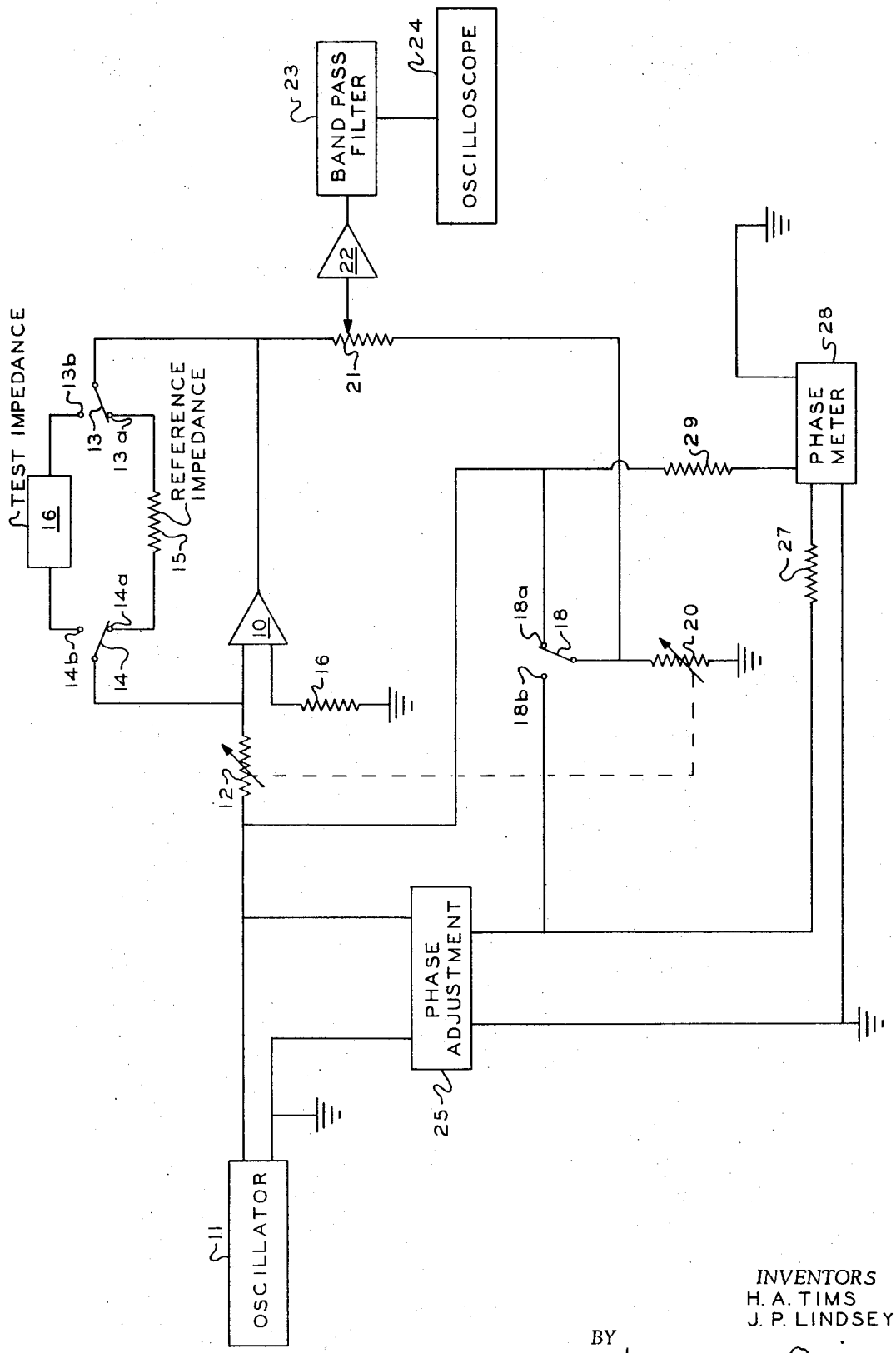
INVENTORS
H. A. TIMS
J. P. LINDSEY
BY Young & Quigg
ATTORNEYS

IMPEDANCE MEASURING APPARATUS

It is common practice to map subterranean strata by imparting vibrations to the earth and measuring vibrations which are reflected back to the surface. The reflected vibrations are measured by the use of geophones which are spaced along the surface of the earth in predetermined geometrical patterns with respect to the shot point. These geophones are transducing elements which convert mechanical vibrations into corresponding electrical signals. A common type of geophone is one in which a movable coil is mounted by springs in a magnetic field which is established by one or more magnets positioned within the geophone housing. When the housing is subjected to vibrations, the coil tends to move relative to the magnetic field so that an electrical signal is generated across the coil.

Large numbers of these geophones are commonly used in typical seismic exploration procedures with the outputs of a plurality of geophones often being combined to provide amplified signals. It is desirable that the impedances of the individual geophones be matched in many procedures. Accordingly, a need exists for apparatus which is capable of measuring the complex impedance of a geophone quickly and at low cost.

In accordance with this invention, apparatus is provided to accomplish this result. A high gain operational amplifier is employed in which the impedance element to be measured and a reference element are selectively connected in a feedback loop. A variable calibration resistor constitutes an input impedance of the amplifier. A function generator which is capable of providing two alternating current signals of the same frequency but at different phases relative to one another is employed to energize the circuit. The first output of the generator is applied to the input of the amplifier. A second variable calibrated resistance element is selectively connected to the two outputs of the function generator. The voltage across the second resistance element is balanced against the output of the amplifier. By selectively inserting the reference impedance element and the test impedance element in the amplifier feedback and the second resistance element across the two outputs of the function generator, it is possible to measure the impedance of the unknown element. A phase meter is provided to measure the phase angle of the unknown element.

The accompanying drawing is a schematic circuit illustration of an embodiment of the apparatus of this invention.

Referring now to the drawing in detail, there is shown a high gain operation amplifier 10. The first output terminal of a variable frequency oscillator 11 is connected to the first input of amplifier 10 by an input impedance which comprises a calibrated variable resistor 12. The second input terminal of amplifier 10 is connected to ground by a resistor 16. The output of amplifier 10 is connected to a switch 13 which selectively engages terminals 13a and 13b. The first input terminal of amplifier 10 is connected to a switch 14 which selectively engages terminals 14a and 14b. A reference resistance element which comprises a resistor 15 of known resistance is connected between terminals 13a and 14a. A test impedance element 16 to be measured is connected between terminals 13b and 14b.

The first output terminal of oscillator 11 is also connected to a terminal 18a which is adapted to be engaged by a switch 18. A calibrated variable resistor 20 is connected between switch 18 and ground. Resistors 12 and 20 are mechanically connected so that the two resistance elements have the same resistance when they are adjusted in unison. A potentiometer 21 is connected between the output of amplifier 10 and switch 18. The contactor of potentiometer 21 is connected to the input of an amplifier 22. The output of amplifier 22 is connected through a band pass filter 23 to a meter, such as an oscilloscope 24.

A phase adjustment network 25 is also connected to the output of oscillator 11. A second output signal is thus established which has the same frequency as the output signal of oscillator 11, but which can be of different phase depending on the adjustment of network 25. The first output terminal of phase adjustment network 25 is connected to terminal 18b which is selectively engaged by switch 18. The first output terminal of network 25 is also connected through a resistor 27 to the input of a phase meter 28. The first output terminal of oscillator 11 is connected through a resistor 29 to the second input of phase meter 28. Meter 28 thus measures the difference in phase between the two output signals of the function generator which comprises oscillator 11 and phase adjustment network 25. Oscillator 11 and phase adjustment network 25 can be a Variable-Phase Function Generator, Model 203A, which is described in the Operating & Service Manual (1964) of Hewlett-Packard Company, Loveland, Colo. Meter 28 can be an Electronic Counter, Model 5233L, which is described in the Operating & Service Manual (1965) of Hewlett-Packard Company, Palo Alto, Calif.

In the operation of the illustrated apparatus, switches 13 and 14 are first moved into engagement with respective terminals 13a and 14a so that reference impedance element 15 constitutes the feedback of amplifier 10. Resistors 12 and 20 are adjusted so as to have the same resistance as element 15, thus establishing a unity gain amplifier. Switch 18 is in engagement with terminal 18a at this time. The frequency of oscillator 11 is adjusted so as to approximate the natural resonance frequency of the geophone (element 16) to be tested. This frequency is of the order of 14 to 15 cycles per second for certain commercially available geophones. The contactor of potentiometer 21 is then adjusted until a null signal is detected on oscilloscope 24. Switch 18 is then moved into engagement with terminal 18b. At this time the amplitude of the output signal from oscillator 11 and phase adjustment network 25 are adjusted until a null signal is again detected on oscilloscope 24. This completes the initial balance.

Switches 13 and 14 are then moved into engagement with respective terminals 13b and 14b to connect the test impedance into the circuit in place of the reference impedance. Switch 18 remains in engagement with terminal 18b. Variable resistors 12 and 20 are then adjusted and phase adjustment network 25 is adjusted, as may be required, until a null signal is once again read on oscilliscope 24. When the circuit is thus balanced, the resistance of calibrated resistor 12 provides an indication of the impedance of test impedance element 16. The reading of phase meter 28 provides an indication of the phase angle of the unknown impedance.

While this invention has been described in conjunction with the measurement of the impedance of a geophone, it should be apparent that the apparatus can be employed to measure the complex impedance of nearly any type of impedance element. Amplifier 22 provides sufficient gain to permit an accurate measurement to be made of the condition of balance. Band-pass filter 23 is set to pass only frequencies corresponding to the frequency of oscillator 11 so as to reduce stray noise signals. It is usually desirable that this band-pass filter be adjustable to accommodate different output frequencies of oscillator 11.

While the invention has been described in conjunction with a presently preferred embodiment, it should be evident that it is not limited thereto.

What is claimed is:

1. Impedance measuring apparatus comprising:
   an amplifier having an input and an output;
   first switching means to connect a reference impedance element and a test impedance element selectively between the output and the input of said amplifier;
   a function generator having first and second outputs, said function generator providing alternating current signals at said first and second outputs, and including means to vary the phase of the signal at one of the outputs relative to the phase of the signal at the other output;
   a first calibrated adjustable resistor connected between the first output of said function generator and the input of said amplifier;
   a second calibrated adjustable resistor mechanically connected to said first resistor so that the two resistors have common resistance;

second switching means to apply the first and second outputs of said function generator selectively across said second resistor; and adjustable means to compare the voltage across said second resistor with the output of said amplifier.

2. The apparatus of claim 1 wherein said means to compare comprises a potentiometer having one end terminal connected to the output of said amplifier and the second end terminal connected to said second switching means, and a meter connected to the contactor of said potentiometer.

3. The apparatus of claim 2, further comprising a second amplifier and a band-pass filter connected between the contactor of said potentiometer and said meter.

4. The apparatus of claim 3 wherein said meter is an oscilloscope.

5. The apparatus of claim 1, further comprising a phase meter to measure the difference in phase between two alternating current signals of common frequency, said phase meter having first and second inputs, and means connecting said first and second inputs to the first and second outputs of said function generator, respectively.